(12) United States Patent
Ripa et al.

(10) Patent No.: US 11,973,238 B2
(45) Date of Patent: Apr. 30, 2024

(54) COMPARTMENT FOR A DEVICE FOR STORING ELECTRICAL ENERGY FOR A MOTOR VEHICLE

(71) Applicant: Valeo Systemes Thermiques, Le Mesnil Saint Denis (FR)

(72) Inventors: Jerome Ripa, Le Mesnil Saint Denis (FR); Stephan Andre, Le Mesnil Saint Denis (FR); Sergio Da Costa Pito, Le Mesnil Saint Denis (FR); Emmanuel Henon, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 539 days.

(21) Appl. No.: 17/277,854

(22) PCT Filed: Aug. 14, 2019

(86) PCT No.: PCT/FR2019/051923
§ 371 (c)(1),
(2) Date: Mar. 19, 2021

(87) PCT Pub. No.: WO2020/058586
PCT Pub. Date: Mar. 26, 2020

(65) Prior Publication Data
US 2021/0367303 A1 Nov. 25, 2021

(30) Foreign Application Priority Data

Sep. 20, 2018 (FR) ...................................... 1858498

(51) Int. Cl.
*H01M 50/244* (2021.01)
*B60L 50/64* (2019.01)
(Continued)

(52) U.S. Cl.
CPC ........... *H01M 50/244* (2021.01); *B60L 50/64* (2019.02); *B60L 58/26* (2019.02); *H01M 10/613* (2015.04);
(Continued)

(58) Field of Classification Search
CPC ............ H01M 50/244; H01M 10/613; H01M 10/625; H01M 10/6556; H01M 10/6568;
(Continued)

(56) References Cited

U.S. PATENT DOCUMENTS 10,629,860 B2 * 4/2020 Schröder ............. H01M 10/625
10,784,544 B2 * 9/2020 Kellner ............. H01M 10/6556
(Continued)

FOREIGN PATENT DOCUMENTS

CN 105680608 A 6/2016
DE 3739585 C1 5/1989

OTHER PUBLICATIONS

International Search Report and Written Opinion issued in corresponding International Patent Application No. PCT/FR2019/051923, dated Oct. 21, 2019 (10 pages).

*Primary Examiner* — Abdullah A Riyami
*Assistant Examiner* — Nader J Alhawamdeh
(74) *Attorney, Agent, or Firm* — Osha Bergman Watanabe & Burton LLP

(57) ABSTRACT

The invention relates to a compartment for a device (16) for storing electrical energy for a motor vehicle, said compartment being arranged to receive at least one cell (14) for storing electrical energy, said compartment comprising: —a bottom wall (26), the bottom wall preferably comprising a composite material, —a side wall (28) connected to the bottom wall, —a channel (50) for circulating a cooling fluid, said channel being at least partially formed by the bottom wall, —a fluid connection element (100) designed to allow the channel to be connected with an external cooling fluid circuit, the connection element being at least partially overmoulded with the bottom wall or the side wall.

8 Claims, 2 Drawing Sheets

(51) Int. Cl.
    *B60L 58/26*     (2019.01)
    *H01M 10/613*     (2014.01)
    *H01M 10/625*     (2014.01)
    *H01M 10/6556*     (2014.01)
    *H01M 10/6568*     (2014.01)
    *H01M 50/204*     (2021.01)
    *H01M 50/249*     (2021.01)
    *H01M 50/271*     (2021.01)

(52) U.S. Cl.
    CPC ..... *H01M 10/625* (2015.04); *H01M 10/6556* (2015.04); *H01M 10/6568* (2015.04); *H01M 50/204* (2021.01); *H01M 50/249* (2021.01); *H01M 50/271* (2021.01); *H01M 2220/20* (2013.01)

(58) Field of Classification Search
    CPC ............. H01M 50/204; H01M 50/249; H01M 50/271; H01M 2220/20; B60L 50/64; B60L 58/26; Y02E 60/10; Y02T 10/70
    See application file for complete search history.

(56) References Cited

U.S. PATENT DOCUMENTS

| | | | |
|---|---|---|---|
| 2011/0206967 A1 | 8/2011 | Itsuki | |
| 2013/0207459 A1* | 8/2013 | Schroder | H01M 50/264 307/10.1 |
| 2013/0299232 A1* | 11/2013 | Fitz-Patrick | H05K 7/20636 174/547 |
| 2018/0205045 A1* | 7/2018 | Schröder | H01M 50/264 |
| 2018/0261897 A1* | 9/2018 | Kellner | H01M 10/6569 |
| 2021/0367303 A1* | 11/2021 | Ripa | H01M 50/204 |

\* cited by examiner

COMPARTMENT FOR A DEVICE FOR STORING ELECTRICAL ENERGY FOR A MOTOR VEHICLE

The invention relates to an electrical energy storage device for a motor vehicle, comprising a housing with at least one electrical energy storage cell housed in the housing. The invention also relates to a compartment for an electrical energy storage device for a motor vehicle.

In the automotive field it is known practice to employ electric batteries in the form of modules. Each module comprises a plurality of electrical energy storage cells housed in a housing. It is thus easier to combine the electric batteries to obtain a desired charge capacity. It is also easier, in that way, to mount the battery on the motor vehicle as the storage cells are protected by the housing.

Application US 2011/0206967 A describes an example of such a battery. In that application, the cells are stored in containers that have spaces reserved for housing the cells. One wall of the containers, intended to be in contact with a wall of an adjacent container, has indentations that form part of a coolant circulation duct.

The object of the invention is to propose an improved electrical energy storage device for a motor vehicle.

Thus, one subject of the invention is a compartment for an electrical energy storage device for a motor vehicle, this compartment being designed to house at least one electrical energy storage cell, this compartment comprising:
- a bottom wall, the bottom wall preferably containing a composite material,
- a lateral wall connected to the bottom wall,
- a canal for the circulation of a coolant, this canal being at least partially formed by the bottom wall,
- a fluidic-connection element designed to allow the canal to be connected to an external coolant circuit, the connection element being at least partially overmolded with the bottom wall or with the lateral wall.

The connection element according to the invention allows the canal of the compartment to be connected quickly and in a fluid tight manner to the external circuit.

This element is easier to manufacture with the rest of the compartment as it is fixed by overmolding on a wall of the compartment.

This compartment advantageously forms the lower part of a housing which, together with a cover, houses battery cells.

This compartment and the cover are for example each made from a sheet of composite material, notably containing glass fibers, possibly as an alternative carbon fibers or fibers of some other nature, preimpregnated with a thermoplastic resin.

According to one of the aspects of the invention, the fluidic-connection element is of the "quick connect" type that can be connected quickly.

According to one of the aspects of the invention, the connection element comprises an end piece with an annular groove designed to accept a complementary relief belonging to a complementing connection element so that when the two connection elements are assembled, they form a connection that allows the coolant to circulate between the canal and the external circuit.

According to one of the aspects of the invention, the end piece comprises a frustoconical flank to facilitate collaboration with the complementary connection element.

According to one of the aspects of the invention, the end piece is made of aluminum, steel or plastics material.

According to one of the aspects of the invention, the end piece comprises a slot in which there is overmolded material.

According to one of the aspects of the invention, the end piece is arranged through an orifice formed in the lateral wall and/or in the bottom wall.

According to one of the aspects of the invention, the connection elements are designed to be connected to one another by snap fastening.

According to one of the aspects of the invention, the compartment comprises a canal for the distribution of coolant or refrigerant, and a canal for collecting coolant, each canal communicating with an associated connection element, as described hereinabove, in order respectively to allow the distribution canal to be supplied from the external circuit and allow refrigerant to be removed by the external circuit.

According to one of the aspects of the invention, the canal or each canal comprises a channel formed by the bottom wall and a cap designed to close this channel and thus form the canal, closure notably being achieved by welding this cap onto the bottom wall.

According to one of the aspects of the invention, the cap is of longilinear shape.

According to one of the aspects of the invention, the cap is substantially flat.

According to one of the aspects of the invention, the cap comprises at least one elbow, to conform to an elbow of the canal, notably two elbows.

According to one of the aspects of the invention, one of the ends of the cap of the canal faces the so-called quick-connect connection element.

According to one of the aspects of the invention, the channel communicates with at least one orifice, notably with a plurality of orifices, in order to cause the coolant to communicate with one or more heat exchangers.

According to one of the aspects of the invention, this or these heat exchangers are notably each a plate with internal canals for the circulation of coolant.

According to one of the aspects of the invention, each cap covers less than 10%, notably 5%, of the surface area of the bottom wall.

According to one of the aspects of the invention, each cap is made of a plastics material.

In particular, each cap is made from a thermoplastic material identical to or compatible with that used for the compartment, so as to allow assembly by welding.

A further subject of the invention is an electrical energy storage device for a motor vehicle, comprising a compartment as described hereinabove and at least one electrical energy storage cell, notably a plurality of cells, housed in this compartment.

The housing formed by the compartment and possibly closed by an attached cover, including battery cells, may be placed on the body shell of the vehicle. The hydraulic couplings are then fixed in a fluid tight manner to this compartment or housing in order to cause the coolant to circulate through the canals of the compartment, the fluid coming from a circuit external to this housing.

Further features and advantages of the invention will become clearly apparent from reading the following description, given by way of illustrative and nonlimiting example, and with studying the attached drawings among which:

FIGS. 1 and 2 illustrate a first example 10 of an electrical energy storage device for a motor vehicle. The motor vehicle may notably be a car, a truck or a bus.

The electrical energy storage device 10 comprises a housing 12 and electrical energy storage cells 14. The cells 14 are, for example, mounted electrically in series.

Figure 1:
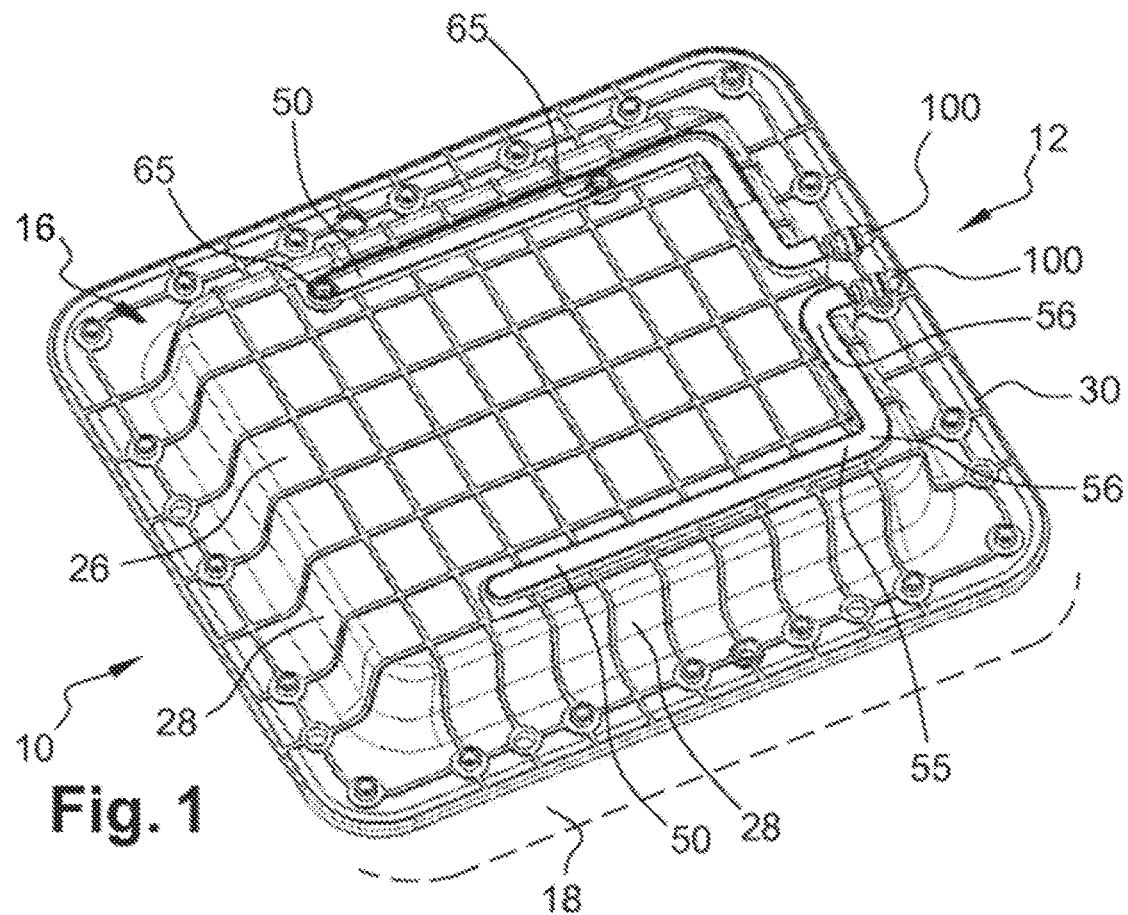
FIGS. 1 to 5 are views of one embodiment of the invention.
Figure 2:
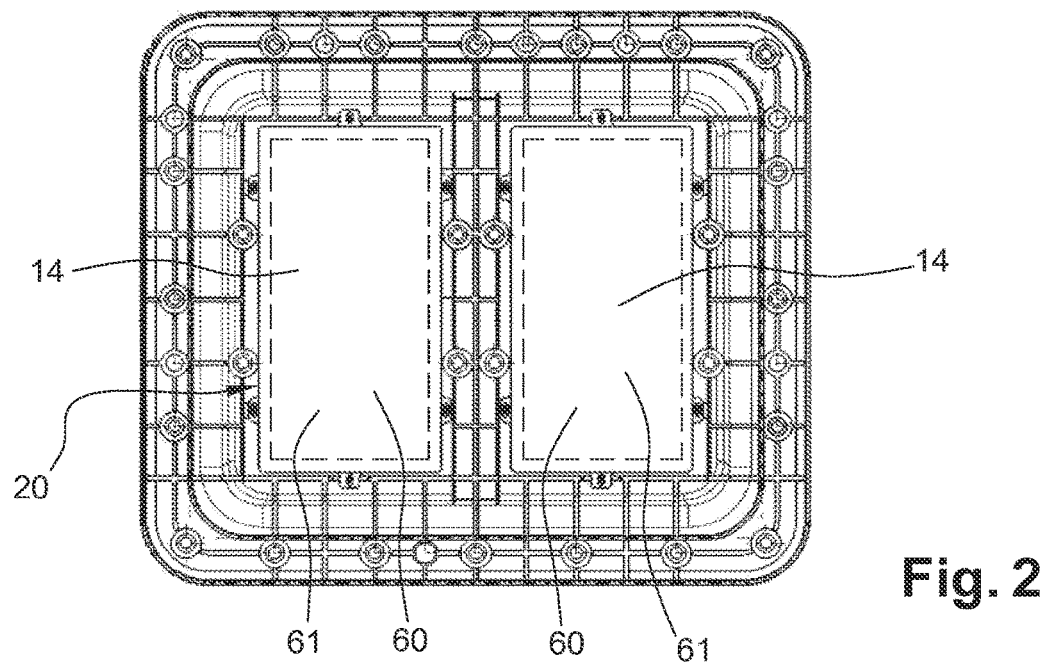

The housing 12 is formed, as can be seen more clearly in FIG. 1, of a lower compartment 16 and of an attached component 18 intended to close the housing 12 to protect the cells 14. The attached component 18 here is a cover, which covers a housing space 20 defined by the part 16.

The compartment 16 has a dished shape, with a bottom wall 26, lateral walls 28, and a flange 30.

The compartment 16, which is designed to house the electrical energy storage cells, comprises:
- the bottom wall 26, the bottom wall containing a composite material,
- lateral walls 28 connected to the bottom wall 26,
- canals 50 for the circulation of a coolant, each canal 50 being at least partially formed by the bottom wall 26,
- fluidic-connection elements 100 designed to allow the canals 50 to be connected to an external coolant circuit, not depicted, each connection element 100 being at least partially overmolded with the bottom wall or with the lateral wall.

This compartment 16 forms the lower part of the housing 12 which, with a cover, houses battery cells.

This compartment 16 and the cover 18 are for example each made from a sheet of composite material, notably containing glass fibers, possibly as an alternative carbon fibers or fibers of some other nature, preimpregnated with a thermoplastic resin.

Figure 4:
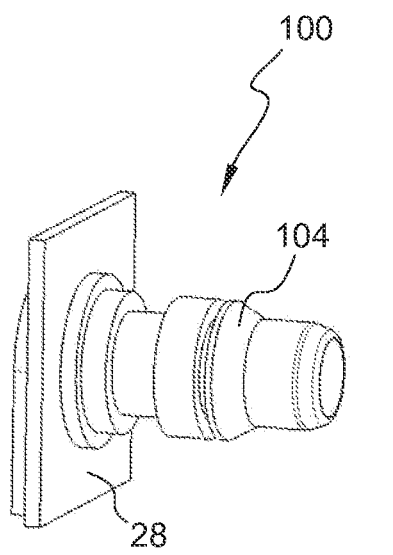
Figure 5:
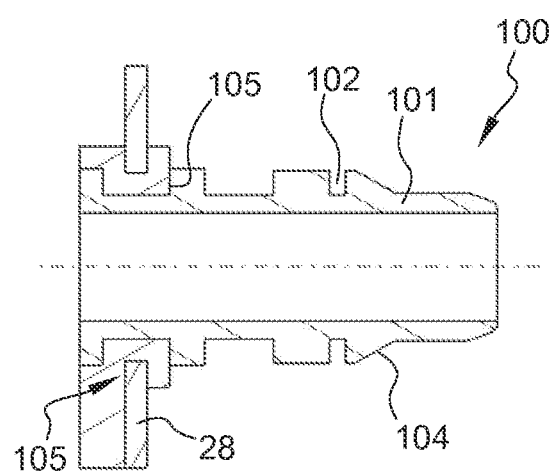

As visible in FIGS. 4 and 5, each fluidic-connection element 100 is of the "quick connect" type that can be connected quickly, and comprises an end piece 101 with an annular groove 102 designed to accept a complementary relief belonging to a complementary connection element, not depicted, so that when the two connection elements are assembled, they form a connection that allows the coolant to circulate between the canal 50 and the external circuit.

As visible in FIGS. 4 and 5, the end piece 101 comprises a frustoconical flank 104 to facilitate collaboration with the complementary connection element.

The end piece 101 is made for example of aluminum.

The end piece comprises a slot 105 in which there is some overmolded material of the wall 28.

The end piece is arranged through an orifice 105 formed in the lateral wall 28.

The connection elements are designed to be connected to one another by snap fastening.

The compartment 16 comprises a canal 50 for distributing coolant or refrigerant, and a canal 50 for collecting coolant, each canal communicating with an associated connection element, as described hereinabove, to respectively allow the distribution canal to be supplied from the external circuit and allow refrigerant to be removed by the external circuit.

Figure 3:
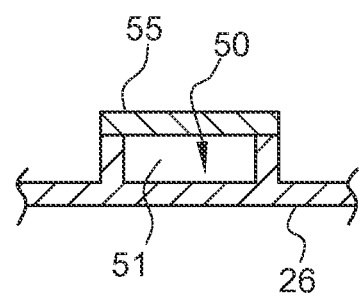

Each canal 50 comprises a channel 51 formed by the bottom wall 26 and a cap 55 designed to close this channel 51 and thus form the canal 50, closure being achieved notably by welding this cap onto the bottom wall, as illustrated in FIG. 3.

Each cap 55 is of longilinear shape and is substantially flat.

Each cap 55 comprises, in order to conform to an elbow in the canal, notably two elbows 56.

One of the ends of the cap of the canal 50 faces the connection element 100. The channel 51 communicates with a plurality of orifices 65 in order to cause the coolant to communicate with one or more heat exchangers 60.

These heat exchangers 60 are notably each a plate 61 with interior canals for the circulation of coolant.

Each cap 55 covers less than 10%, notably 5%, of the surface area of the bottom wall 26.

According to one of the aspects of the invention, each cap 55 is made of plastics material.

The coolant employed in this case may notably be a liquid coolant based on carbon dioxide, such as R744 for example, 2,3,3,3-tetrafluoropropene (or HFO-1234yf) or 1,1,1,2-tetrafluoroethane (or R-134a). The coolant may also be a nanofluid. The coolant may even be water, possibly containing additives.

The invention claimed is:

1. A compartment for an electrical energy storage device for a motor vehicle, the compartment being configured to house at least one electrical energy storage cell, the compartment comprising:
   - a bottom wall containing a composite material;
   - a lateral wall connected to the bottom wall;
   - a canal for the circulation of a coolant, the canal being at least partially formed by the bottom wall; and
   - a fluidic-connection element configured to allow the canal to be connected to an external coolant circuit, the connection element being at least partially overmolded with the bottom wall or with the lateral wall,
   - wherein the compartment comprises a canal for the distribution of coolant or refrigerant, and a canal for collecting coolant, each canal communicating with an associated connection element, in order respectively to allow the distribution canal to be supplied from the external circuit and allow refrigerant to be removed by the external circuit, and
   - wherein the canal or each canal comprises a channel formed by the bottom wall and a cap configured to close the channel and thus form the canal, closure being achieved by welding the cap onto the bottom wall.

2. The compartment as claimed in claim 1, wherein the fluidic-connection element is of the "quick connect" type that can be connected quickly.

3. The compartment as claimed in claim 2, wherein the connection element comprises an end piece with an annular groove configured to accept a complementary relief belonging to a complementing connection element so that when the two connection elements are assembled, they form a connection that allows the coolant to circulate between the canal and the external circuit.

4. The compartment as claimed in claim 3, wherein the end piece is arranged through an orifice formed in the lateral wall and/or in the bottom wall.

5. The compartment as claimed in claim 1, wherein the cap is substantially flat.

6. The compartment as claimed in claim 1, wherein the channel communicates with a plurality of orifices, in order to cause the coolant to communicate with one or more heat exchangers.

7. The compartment as claimed in claim 6, wherein the heat exchangers are each a plate with internal canals for the circulation of coolant.

8. An electrical energy storage device for a motor vehicle, comprising:
   - a compartment comprising:
     - a bottom wall containing a composite material,
     - a lateral wall connected to the bottom wall,
     - a canal for the circulation of a coolant, the canal being at least partially formed by the bottom wall, and a fluidic-connection element configured to allow the canal to be connected to an external coolant circuit, the connection element being at least partially overmolded with the bottom wall or with the lateral wall; and
at least one electrical energy storage cell housed in the compartment,
wherein the compartment comprises a canal for the distribution of coolant or refrigerant, and a canal for collecting coolant, each canal communicating with an associated connection element, in order respectively to allow the distribution canal to be supplied from the external circuit and allow refrigerant to be removed by the external circuit, and
wherein the canal or each canal comprises a channel formed by the bottom wall and a cap configured to close the channel and thus form the canal, closure being achieved by welding the cap onto the bottom wall.

* * * * *